April 24, 1934. F. J. JESCHKE Re. 19,149

ABRASIVE STONE HOLDER

Original Filed June 30, 1928

INVENTOR.
Frank J. Jeschke
BY
Parker & Burton
ATTORNEYS

Reissued Apr. 24, 1934

Re. 19,149

UNITED STATES PATENT OFFICE 19,149

ABRASIVE STONE HOLDER

Frank J. Jeschke, Detroit, Mich., assignor to Micromatic Hone Corporation, Detroit, Mich., a corporation of Michigan Original No. 1,821,518, dated September 1, 1931, Serial No. 289,370, June 30, 1928. Application for reissue March 6, 1933, Serial No. 659,857

22 Claims. (Cl. 51—184.1)

My invention relates to an improved holder for an abrasive stone to be used in a grinding tool.

The holder is adapted to support the stone upon the tool in a suitable manner such as is shown in my applications, Serial Nos. 239,858 and 247,785. Holders of this general type are shown in such applications but are not therein specifically claimed though reference is made thereto as a disclosure.

The present application relates to such a holder as a mounting for the stone.

An object is to provide, in conjunction with a supporting base member, a stone fitted with an improved back structure receivable upon said base member and adapted to be releasably secured thereto and to various improved structural features inherent in such combination as here illustrated.

Various advantages, improved features, and structural elements will appear more fully from the following description, appended claims and accompanying drawing, wherein:

Figure 1:
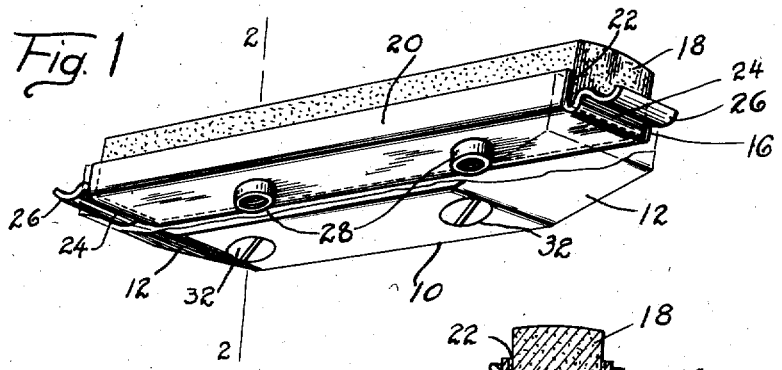
Fig. 1 is a perspective of an embodiment of my invention.
Figure 2:
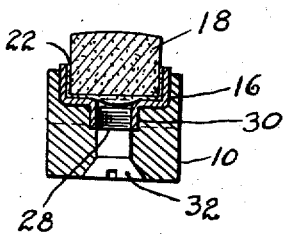
Fig. 2 is a vertical sectional view taken on the line 2—2 of Fig. 1.
Figure 3:
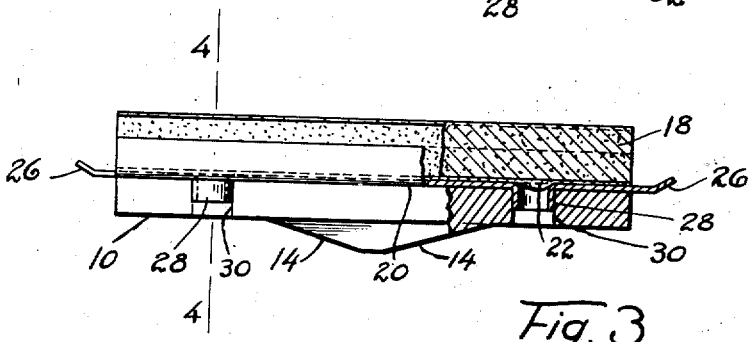
Fig. 3 is a side elevation partly in section of a slightly modified form of my invention.
Figure 4:
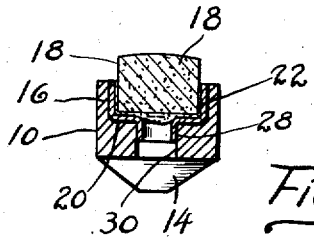
Fig. 4 is a cross-sectional view taken on the line 4—4 of Fig. 3.

My invention embodies in an abrasive holder a base member indicated in the several figures as 10 which, in Figs. 1 and 2, is shown as having tapered or cam faces at its opposite ends indicated as 12, and in Figs. 3 and 4 as having cam faces formed on an intermediate part of the base member indicated by the numeral 14. These cam faces are engaged by adjustable devices carried by the tool equipped with these abrasives and such structure forms no material part of the invention here claimed.

Each base member has formed on the side opposite the cam faces a channel 16, within which the abrasive stone 18 is seated. This abrasive stone is provided with a metal back plate 20 which is cemented or otherwise fastened about the stone 18, and in Figs. 2 and 4 cement is shown at 22 as employed for this purpose.

In Fig. 1 the bottom of the metal channel back member 20 has its extending end portions bent upwardly as at 24 engaging opposite ends of the stone to assist in positioning the stone securely therein. Such end portion of the back member is in each case extended and shaped to form a hook 26, all for the purpose as described in pending applications hereinabove referred to.

The metal back plate carried by each stone is provided with radial and cylindrical extensions in the form of nipples 28 which are received within corresponding apertures 30 that extend transversely through the base member 10. In Figs. 1 and 2 these nipples are shown as seating against a shoulder in said apertures 30 and are interiorly threaded to receive screws 32 which extend through the apertures and engage the nipples.

In Figs. 3 and 4 the screws are dispensed with and the nipples seat within recesses in the form of apertures indicated by the same numerals and this serves to hold the stone in position. This type of mounting possesses many advantages over engaging the stone itself with fastentening devices of one sort or another within a base member.

What I claim is:

1. An abrasive element for a grinding tool comprising, in combination, a base member having a channel supporting face provided with apertures extending therefrom through the base member, an abrasive stone having a metal back plate adapted to seat within the channel of the base and upon the supporting face thereof and provided with threaded nipples receivable within the apertures of the base, and fastening means extending through the apertures in the base member and engaging said threaded nipples to secure the abrasive stone to the base member.

2. An abrasive element for a grinding tool comprising, in combination, a base member having a channel, the bottom of which is adapted to serve as a supporting face for an abrasive stone and is provided with a recess, an abrasive stone provided with a metal back plate receivable within said channel to seat upon the bottom thereof and having a nipple receivable within said recess to lock the stone therein against displacement.

3. An abrasive element for a grinding tool comprising, in combination, a base member provided on one side with two relatively angularly arranged cam faces and on the opposite side with a supporting face and apertures extending through the base member between said cam faces and opening into the supporting face, an abrasive stone carrier seated upon said supporting face provided with projecting portions engaged within said apertures to hold the stone in position.

4. An abrasive element for a grinding tool comprising, in combination, a base member having a supporting face, an abrasive stone carrier member seated upon said face, abutments on the base member engaging opposite sides of said stone carrier member, and interengaging portions formed on the stone carrier member and base member, one of said members being provided with a substantially cylindrical opening and the other being provided with an interengaging radial extension.

5. An abrasive element for a grinding tool comprising, in combination, a base member having a supporting face, an abrasive stone seated thereon and provided with a metal back extending beyond and bent to engage the ends of the stone and terminating in hooks, and means engaging the metal back of the stone to the base.

6. An abrasive element for a grinding tool comprising, in combination, a base member having a supporting face, an abrasive stone seated thereon and provided with a metal back extending beyond the ends of the stone and bent at its ends to engage therewith to prevent longitudinal displacement of the stone, and means engaging the metal back of the stone to the base to secure the stone in place thereon.

7. An abrasive element for a grinding tool comprising, in combination, a base member having a channel for receiving an abrasive stone, an abrasive stone seated within said channel, a sheet metal channel back supporting said stone and means forming part of said back for securing the metal back of the stone to the base member to position the stone in place thereon.

8. An abrasive element for a grinding tool comprising an abrasive stone and a metal back therefor extending beyond the stone, said extension being bent over the end of the stone and further extended in a direction away from said stone.

9. An abrasive element for a grinding tool comprising an abrasive stone and a metal back therefor extending beyond the stone, said extension being bent over the end of the stone and terminating in a hook.

10. An abrasive element for a grinding tool comprising a base member and an elongated abrasive stone carrier mounted on the base member, interengaging portions being formed by a radial extension on the stone carrier and a corresponding aperture in said base member.

11. The combination with a longitudinally fixed radially movable base member as an element of a grinding tool, of an abrading stone, a backing element for said stone receivable by said base member, and means on said backing element extending rearwardly of said stone for positioning said stone and retaining it against longitudinal movement on said base member.

12. The combination with a radially adjustable base member as an element of a grinding tool, of an abrading stone, a backing element for said stone receivable by said base member, and means on said backing member for releasably securing said backing element and stone to said base member to prevent a relative longitudinal movement therebetween.

13. The combination with a radially adjustable base member as a portion of a grinding tool, a backing element for an abrading stone receivable by said base member, flanged portions extending rearwardly of said element and cooperating with said base member to prevent relative longitudinal movement therebetween.

14. The combination with a radially adjustable base member as a portion of a grinding tool, of a metal backing element for an abrading stone receivable by said base member, flanged portions on said element extending rearwardly thereof for retaining said backing element against longitudinal movement, and means engaging said rearwardly extending flange portions for retaining said backing element against outward movement.

15. A radially movable base member for a honing tool, in combination with a channel-shaped backing member for an abrading element, and projecting portions on said backing member for positioning the backing member relative to the base member against longitudinal movement therebetween.

16. A radially adjustable base member for a honing tool, in combination, with an independent metal backing member for supporting an abrading element, means on said backing member extending rearwardly thereof and engageable with the base member for preventing relative longitudinal movement therebetween.

17. A radially adjustable base member for a honing tool, in combination with a metal backing member for supporting an abrading element, means extending rearwardly of said backing member and engageable with said base member for preventing relative longitudinal movement therebetween, and means engaging said rearwardly extending means for preventing outward movement of the backing member away from the base member.

18. An abrasive element for a grinding tool including, in combination, a radially adjustable base member, an abrasive stone, a metal back therefor provided with threaded apertures, and screw means extending through said base member in engagement with said threaded aperture for retaining the stone and metal back in fixed relation to each other.

19. The combination with a radially adjustable base member as an element of a grinding tool, of an abrading unit comprising a stone secured to a backing member having a threaded aperture, and screw means extending through said base member in engagement with the thread of said aperture for retaining said unit in fixed relation thereto.

20. The combination with a longitudinally fixed radially movable base member provided with a channel-like slot in its face, an abrading stone, a channel-shaped metal element for receiving said stone, means for retaining said stone fixed to said metal element, and means on said metal element by which said element is releasably retained in the slot of said base member.

21. The combination with a longitudinally fixed radially movable base member provided with a channel-like slot in its face, an abrading stone, a channel-shaped metal element for receiving said stone, said element being provided with a plurality of apertures, and additional means on said metal element by which said element is releasably retained in the slot of said base member.

22. The combination with a longitudinally fixed radially movable base member provided with a channel-like slot in its face, an abrading stone, a channel-shaped metal element for receiving said stone, means for retaining said stone fixed to said metal element, and means constituting a part of said metal element and extending beyond the stone for releasably retaining the element in the slots of said base member.

FRANK J. JESCHKE.